June 16, 1931.  J. POWELL  1,810,437
FEEDER CONVEYER FOR HUSKING UNITS
Filed July 14, 1928

Inventor
John Powell,

Witnesses:—

By
Attorney

Patented June 16, 1931

1,810,437

UNITED STATES PATENT OFFICE

JOHN POWELL, OF KOKOMO, INDIANA

FEEDER CONVEYER FOR HUSKING UNITS

Application filed July 14, 1928. Serial No. 292,748.

This invention relates to improvements in corn harvesters, and more particularly to a novel form of feeder conveyer for a husking unit of the type shown in my former Patent No. 1,622,207, Mar. 22, 1927.

One of the objects of the invention is to provide a feeder conveyer which may be superimposed over the husking unit and will be pivoted at the feed end of said unit to insure the proper feeding and distribution of the ears of corn over the husking unit as they are fed from the chute leading from the gathering and snapping means of the harvester.

Another object of the invention is to provide a relatively floating feeder conveyer which will be provided with a centrally disposed frame about which the conveyer chains are adapted to pass, and oppositely disposed triangular frames or plates positioned adjacent the pivot of the conveyer for supporting spaced rollers which automatically permit the upper and lower flights of the conveyer to adjust themselves according to the number of ears of corn on the husking unit.

A further object of the invention is to provide a floating feeder conveyer for husking units which will automatically tilt upwardly when an over accumulation of corn piles up at the entrance of the husking unit, thereby utilizing its weight adjacent its pivotal end to spread the corn out evenly over the said husking unit, after which the conveyer will assume its normal or substantially horizontal position.

With the above and other objects in view which will more readily appear as the nature of the invention is better understood, the same consists in the novel construction, combination and arrangement of parts hereinafter more fully described, illustrated and claimed.

Preferred and practical embodiments of the invention are shown in the accompanying drawings, in which:—

Similar reference characters designate corresponding parts throughout the several figures of the drawings.

Figure 1:
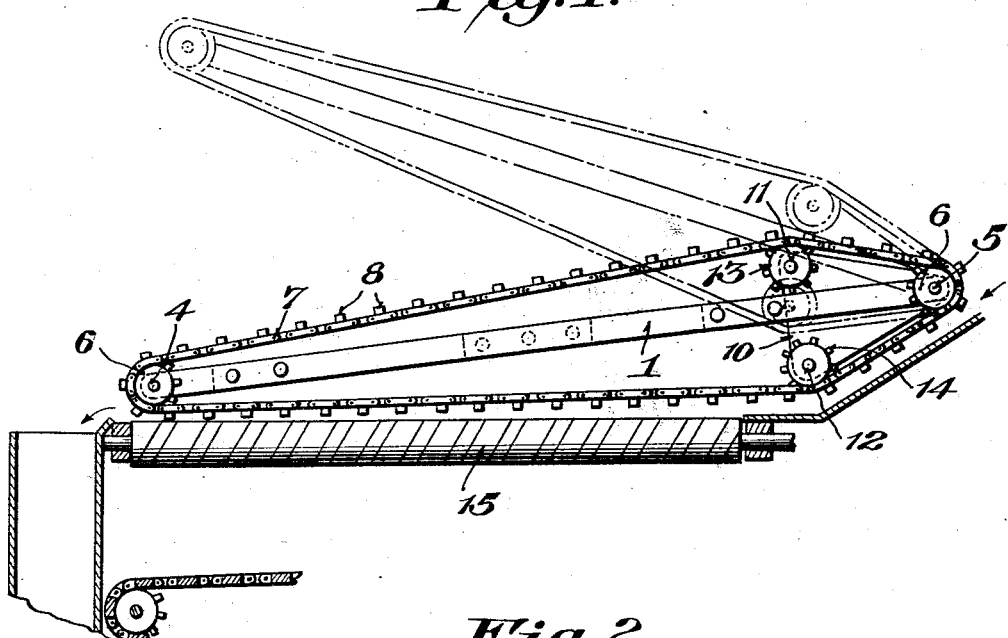
Figure 1 is a side elevation of my improved feeder conveyer showing its position with respect to the husking unit and feed chute, also showing in dotted lines the conveyer in elevated position.
Figure 2:
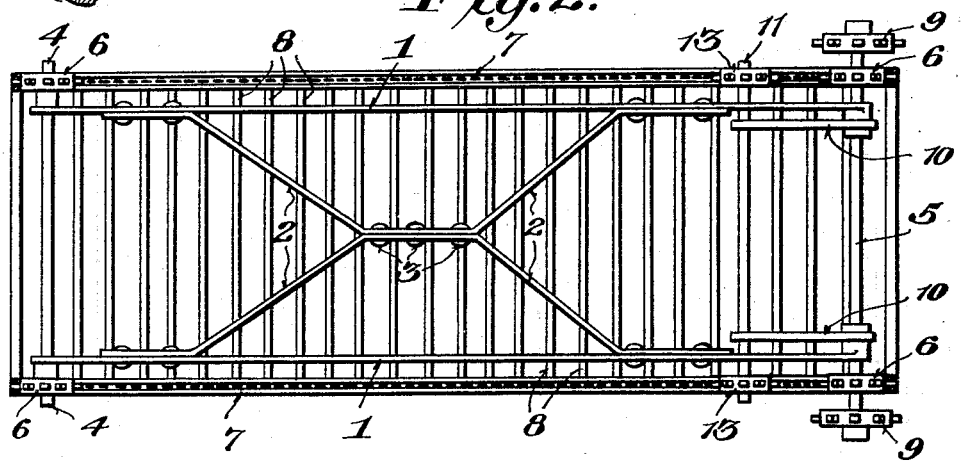
Figure 2 is a plan view of my improved feeder conveyer.
Figure 3:
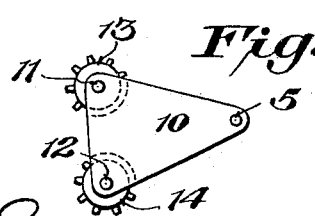
Figure 3 is a side elevation of one of the triangular end plates or frames which support the spacing rollers for the conveyer.

My improved conveyer is provided with spaced side floating frame members 1 which are secured in fixed position through the medium of the brace members 2 held together by the bolts 3. The shafts 4 and 5 are mounted between the opposite ends of the frame members 1 and support the sprockets 6 adjacent their outer ends. The sprockets 6, in turn support and drive the conveyer chains 7 which are joined together by a plurality of slats 8. A pair of driving sprockets 9 are fastened to the shaft 5 for driving the conveyer.

The shaft 5 serves as an axis for and also supports a pair of pivotally mounted triangular frames or plates 10 which are drilled to receive a pair of shafts 11 and 12 upon which the spaced rollers 13 and 14 are mounted. These rollers are adapted to positively contact and have a rolling engagement respectively with the upper and lower flights of the conveyer chains 7.

As previously indicated, the present type of feeding conveyer is adapted particularly for use in connection with a series of husking rolls which remove the husks from the ears of corn. This unit is designated generally as 15 and may be of the type shown in the previously referred to patent with which it has been advantageously used to provide superior means for pressing the corn into contact with the husking rollers. It will be apparent that considerable advantage is obtained by mounting the feeding conveyer in the manner described not only because the entire feeding mechanism has a tendency to float and yieldingly press the corn with the husks thereon against the husking rolls during the operation of the machine but also has the advantage of permitting the operator to lift or raise the entire conveyer on the shaft 5 as an axis to facilitate cleaning and oiling of the husking rolls when the apparatus is not in use.

A slanting feed chute 16 terminates adjacent the pivotal end of the conveyer and slightly therebelow, and extends from the gathering and snapping unit of a harvester of the general construction shown and described in my co-pending application Serial No. 18,718, filed Mar. 27, 1925.

From the foregoing description, it will be apparent that the mode of operation of the floating feeder conveyer is as follows: Assuming that the harvester is in operation, and the ears of corn slide down the chute 16, the rotation of the conveyer (clockwise as viewed in Figure 1) will cause the said ears of corn to be evenly distributed over the husking unit. However, if the corn is fed too fast and piles up at the entrance of the husking unit, the conveyer will be raised upwardly at an angle on the shaft 5, thereby concentrating the whole weight of the conveyer upon the pile of corn. This will have a tendency to force the pile of corn to spread out and consequently break up the jam at the entrance of the husking unit. As soon as the jam is broken, the conveyer will automatically drop back into its normal position and the corn will be evenly distributed again over the rolls of the husking unit.

When the device is in use and corn accumulates rapidly at the entrance or throat of the husking unit the entire conveyer will have a tendency to automatically rock or rotate about the shaft 5 as an axis thereby to work the corn into position to be properly fed to the husking rolls. Due to the arrangement for driving the conveyer the chains of the opposite flights thereof will be held separated during the husking action, thereby avoiding the breaking of the conveyer chains and otherwise generally facilitating the husking action.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. In a husking unit, the combination with husking rolls, of means for segregating and passing husk bearing ears of corn over said rolls comprising a conveyer including a frame pivoted at one end, shafts mounted at the ends of said frame, an endless conveyer mounted between said shaft and adapted to engage individual ears of corn and pass the same over the husking rolls and spreading means for holding the respective flights of said conveyer in predetermined spaced relation, said spreading means being pivoted to said frame.

2. In a husking unit, husking rolls, and a feeding mechanism above said rolls for cooperation therewith, said feeding mechanism comprising a frame pivoted at one end, rollers at the ends of said frame, an endless conveyer extending over said rollers, a member pivoted to said frame, and a pair of rollers carried by said member cooperating with the flights of said conveyer to maintain the latter spread apart and to permit vertical movement of the flights of the conveyer with respect to said frame.

3. In a husking unit, husking rolls, and a feeding mechanism above said rolls for cooperation therewith, said feeding mechanism comprising a frame pivoted at one end, rollers at the ends of said frame, an endless conveyer extending over said rollers, and spreading means for holding the respective flights of said conveyer in predetermined spaced relation, said spreading means being mounted on said frame for movement with respect thereto to permit vertical movement of the flights of the conveyer with respect to said frame.

In testimony whereof I hereunto affix my signature.

JOHN POWELL.